United States Patent
Barry

(10) Patent No.: US 11,327,999 B2
(45) Date of Patent: May 10, 2022

(54) REORGANIZATION OF PARTITION BY GROWTH SPACE WITH LOB COLUMNS

(71) Applicant: BMC Software, Inc., Houston, TX (US)

(72) Inventor: Richard E. Barry, Houston, TX (US)

(73) Assignee: BMC Software, Inc., Houston, TX (US)

(*) Notice: Subject to any disclaimer, the term of this patent is extended or adjusted under 35 U.S.C. 154(b) by 359 days.

(21) Appl. No.: 16/722,862

(22) Filed: Dec. 20, 2019

(65) Prior Publication Data

US 2020/0125584 A1 Apr. 23, 2020

Related U.S. Application Data

(63) Continuation of application No. 15/184,209, filed on Jun. 16, 2016, now Pat. No. 10,521,454.

(Continued)

(51) Int. Cl.
*G06F 16/00* (2019.01)
*G06F 16/27* (2019.01)
(Continued)

(52) U.S. Cl.
CPC ........ *G06F 16/278* (2019.01); *G06F 16/2219* (2019.01); *G06F 16/2282* (2019.01); *G06F 16/2365* (2019.01)

(58) Field of Classification Search
CPC ............. G06F 16/2282; G06F 16/2219; G06F 16/2365; G06F 16/24562; G06F 16/2393; G06F 16/2453; G06F 16/24539; G06F 16/27; G06F 16/2358; G06F 16/258; G06F 16/8365; G06F 16/221; G06F 16/211; G06F 16/284; G06F 16/289; G06F 16/8358; G06F 16/2228; G06F 16/278; G06F 16/00; G06F 16/113; G06F 16/235; G06F 16/2448;
(Continued)

(56) References Cited

U.S. PATENT DOCUMENTS

| | | |
|---|---|---|
| 5,408,654 A | 4/1995 | Barry |
| 5,758,357 A | 5/1998 | Barry et al. |

(Continued)

OTHER PUBLICATIONS

Bruni, Paolo et al.: "LOBs with DB2 for z/OS: Stronger and Faster", IBM Corporation, Nov. 2006, 306 pages.

*Primary Examiner* — Yicun Wu
(74) *Attorney, Agent, or Firm* — Brake Hughes Bellermann LLP

(57) ABSTRACT

Systems and methods are provided for reorganizing a partition-by-growth database with LOB columns. An example method includes creating a partition assignment table by performing a logical reorganization of the partition-by-growth database, wherein an assignment of at least one base table row and its corresponding LOB in the partition assignment table differs from a current assignment of the at least one base table row. The method also includes performing a base table reorganization based on the partition assignment table in parallel with a LOB auxiliary table reorganization based on the partition assignment table and a LOB dataset assignment table. The method may also include applying changes to the reorganized base tables and the reorganized LOB auxiliary tables using the partition assignment table.

20 Claims, 5 Drawing Sheets

Related U.S. Application Data

(60) Provisional application No. 62/276,618, filed on Jan. 8, 2016.

(51) Int. Cl.
*G06F 16/22* (2019.01)
*G06F 16/23* (2019.01)

(58) Field of Classification Search
CPC ...... G06F 16/2452; G06F 16/51; G06F 16/80; G06F 16/81; G06F 16/86; G06F 16/2246; G06F 16/245; G06F 16/24553; G06F 16/30
See application file for complete search history.

(56) References Cited

U.S. PATENT DOCUMENTS

| | | |
|---|---|---|
| 9,886,466 B2 | 2/2018 | Parikh et al. |
| 2007/0198591 A1 | 8/2007 | Teng et al. |
| 2008/0243945 A1 | 10/2008 | Hanus et al. |
| 2013/0006940 A1 | 1/2013 | Garza et al. |
| 2013/0246395 A1* | 9/2013 | Charlet ................ G06F 16/289 707/E17.014 |

* cited by examiner

REORGANIZATION OF PARTITION BY GROWTH SPACE WITH LOB COLUMNS

RELATED APPLICATIONS

This application is continuation of, and claims priority to U.S. patent application Ser. No. 15/184,209 filed on Jun. 16, 2016, entitled "REORGANIZATION OF PARTITION BY GROWTH SPACE WITH LOB COLUMNS," which is a Non-Provisional of, and claims priority to, U.S. Provisional Application No. 62/276,618, filed Jan. 8, 2016, entitled "REORGANIZATION OF PARTITION BY GROWTH SPACE WITH LOB COLUMNS," the disclosures of which are incorporated herein in their entireties.

BACKGROUND

Partition-by-growth (PBG) tablespaces are one variety of partitioned databases. Such databases add partitions as needed and tend to become very large very quickly. Some such tablespaces may impose an order on the data with a clustering index. For example, the data may be added by time but ordered by customer number. The database system may endeavor to keep the data in the cluster index order, but the database system will just add new records to the end, adding new partitions as needed, if ordering cannot be maintained. This may lead to inefficiencies in accessing the data because the data is not in the cluster index order. The management of PBG databases is further complicated by the addition of large object (LOB) columns.

SUMMARY

Systems and methods provide an efficient reorganization process for partition-by-growth (PBG) databases with large object (LOB) columns. Disclosed implementations include an improved data verification step as part of the reorg process. The data verification step runs much faster than the traditional Check Data, Check LOB and Check Index routines provided by the database system, which are conventionally run prior to and separate from a reorganization process. Disclosed implementations also include a reorganization process that reorganizes the LOB auxiliary tables in parallel with the base table reorganization and allow LOB rows to change partitions. Parallel reorganization of these tables decreases the processing time to complete the reorganization process, which decreases the number of updates that need to be applied at the end of the process. Implementations also include concurrently writing LOB rows during the LOB auxiliary table reorganization, which occurs in parallel with the reorganization of the base tablespace partitions to further decrease the processing time of the reorganization process. The concurrent writing of LOB rows uses a process that determines ahead of the writing which output LOB dataset a LOB row will be written to. The disclosed implementations all take place while the PBG database is available for read write access and provide full reorganization back into clustering order of the entire PBG table space, not just reorganization within each partition. Thus implementations produce a faster, more efficient reorganization process that results in better performance of the PBG database because the resulting base table is fully in clustering order.

According to an aspect, a computing system includes at least one processor, a partition-by-growth database, the partition-by-growth database including a base table with a large object (LOB) column, the LOB column representing a row ID for a LOB index and the LOB index mapping a row ID to an address, the address corresponding to a LOB row in LOB auxiliary tables, and memory storing instructions that, when executed by the at least one processor, causes the computing system to reorganize the partition-by-growth database. Reorganizing the partition-by-growth database includes creating a partition assignment table by performing a logical reorganization of the partition-by-growth database, wherein an assignment of at least one base table row and its corresponding LOB in the partition assignment table differs from a current assignment of the at least one base table row, performing a base table reorganization based on the partition assignment table in parallel with a LOB auxiliary table reorganization based on the partition assignment table and a LOB dataset assignment table, and applying changes to the reorganized base tables and the reorganized LOB auxiliary tables using the partition assignment table.

In one aspect, a method of reorganizing a partition-by-growth database while the database remains available for updates includes verifying large object (LOB) row IDs and addresses in a (LOB) index, wherein the partition-by-growth database includes a base table with a LOB column, the LOB index, and LOB auxiliary tables, generating a partition assignment table, the partition assignment table mapping each row of the base table to a new partition, the mapping being based on a clustering index, wherein a LOB row associated with a row ID in a base table row maps to the same new partition as the base table row, reorganizing in parallel the base table and the LOB auxiliary tables, wherein reorganizing the LOB auxiliary tables includes writing LOB rows in parallel, the reorganizing being based on the partition assignment table and wherein at least one LOB row changes partitions, and applying changes to the reorganized base tables and the reorganized LOB auxiliary tables using the partition assignment table.

In one aspect, a method of verifying data in a partition-by-growth database, wherein the partition-by-growth database includes a base table with a large object (LOB) column, the LOB column value representing a row ID for a LOB index and the LOB index mapping a row ID to an address, the address corresponding to a LOB row in LOB auxiliary tables, includes generating a LOB check table with one row per row ID in the LOB index, verifying base table rows, verifying LOB auxiliary table rows, and adding an error condition to an error log when the first flag is not satisfied or the second flag is not satisfied for a particular LOB check table entry, wherein verifying the base table and verifying the LOB auxiliary table occurs in parallel. Verifying base table rows can include, for each row in the base table, identifying an entry in the LOB check table that has a row ID that matches the row ID in the LOB column of the base table row, and marking a first flag in the LOB check table entry as satisfied when the LOB check table entry is identified. Verifying LOB auxiliary table rows can include, for each LOB row, identifying a corresponding entry in the LOB check table, marking a second flag in the LOB check table entry as satisfied when the LOB check table entry is identified, and marking a third flag in the LOB check table entry as satisfied when the LOB row has complete data.

Another aspect of the disclosure can be embodied on a computer-readable medium having recorded and embodied thereon instructions that, when executed by a processor of a computer system, cause the computer system to perform any of the methods disclosed herein.

The details of one or more implementations are set forth in the accompanying drawings and the description below.

Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
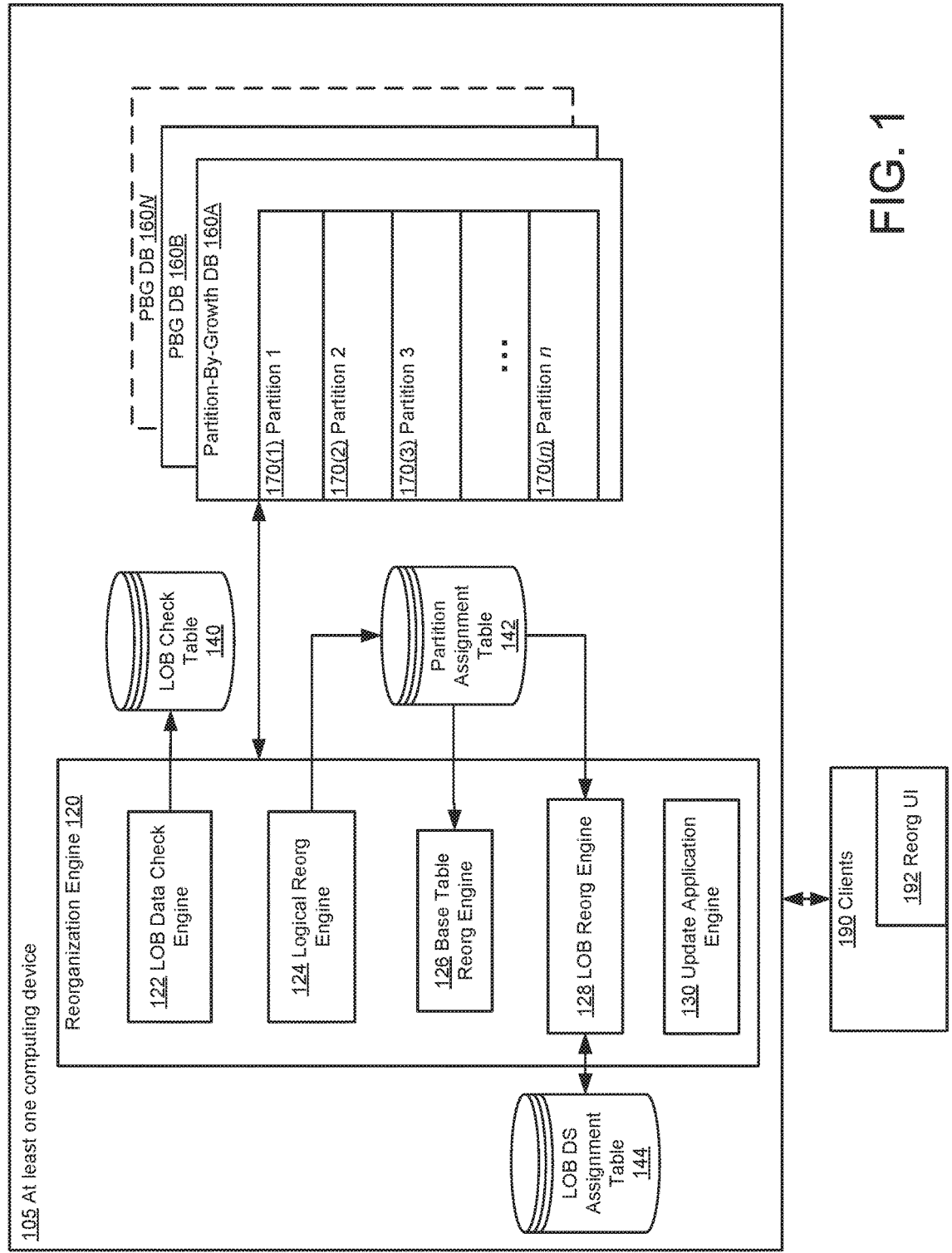
FIG. 1 is a block diagram that illustrates a PBG reorganization system, according to an implementation.

FIG. 1 is a schematic diagram that illustrates an example PBG reorganization system 100. The PBG reorganization system 100 can be embodied, for example, on one or more computing devices. The PBG reorganization system 100 can include, for example, one or more computing devices 105, and one or more clients 190. Computing device 105 may be, for example an IBM zSeries® mainframe computer (zSeries is a registered trademark of the IBM Corporation) or another mainframe or server or other computing device that hosts and manage a PBG database. In some implementations, computing device 105 may represent multiple distributed computing devices. For example, the system 100 may include multiple mainframe computers or servers in communication with each other and/or with clients 190 via one or more networks (not shown in FIG. 1).

The computing device 105 can include one or more processors (CPUs) or banks of processors capable of executing one or more machine executable instructions or pieces of software, firmware, or a combination thereof. The processors are hardware, i.e., processors formed in a substrate. The processors in a mainframe or server may include a plurality of processors managed as one or more central processor complexes. A central processor complex includes physical CPU hardware that is managed as a group. The computing device 105 may also include one or more computer readable storage devices, such as main memory, cache, or disk storage, configured to store data and/or applications, either temporarily, permanently, semi-permanently, or a combination thereof. The storage devices may include volatile memory, non-volatile memory, or a combination thereof.

The computing device 105 includes an operating system. The operating system can be the z/OS operating system from IBM or some other operating system. The computing device 105 includes at least one partition-by-growth (PBG) database 160. For example, the computing device 105 may include PBG database 160A, PBG database 160B, PBG database 160N, etc. A PBG database is a database that divides a tablespace among a plurality of partitions 170. For example, PBG database 160A includes n partitions; 170(1), 170(2), through 170(n). Each partition in a PBG database may include a base tablespace for the base table. PBG databases add new partitions to the tablespace as the number of base table rows grow. Some PBG databases grow quickly and can have many partitions. The base table in a PBG database may have a clustering order, or in other words a preferred sort order based on a column in the base table. The cluster order may be chosen because it is a column that is frequently used to access the data, such as a customer number. For example, a table may exist of customer orders that are saved in the table in time sequence (date of order), but the clustering order is by customer to facilitate finding all the orders for a specific customer. The LOB data might be an image of the customer order form with the customer's signature. When rearranged in customer sequence, any row that is required to be moved to another partition necessitates the moving of the LOB data for that row to the LOB that corresponds to that partition. However, because PBG databases can grow quickly, the records are not guaranteed to be physically stored in this order and, as the PBG database grows, the clustering order is not maintained. This can make access to the data in the base table rows slower.

PBG databases support large objects (LOBs). LOBs enable the database to store a large amount (e.g., 32 kilobytes to two gigabytes) of data for a row in the base table. This is especially useful for storing multimedia files. For example, a LOB may store a video file of a product review with a product information record, where the product information record is a row in the base table. Rather than including the video file in the base table, the PBG includes a LOB column, which stores a row ID for the base table row. The LOB object itself, e.g., the multimedia file, is stored in a row of auxiliary tables within the PBG database. To access the LOB row that corresponds to the base table row, the database uses the row ID in the LOB column of the base table to access a LOB index for the partition. The LOB index stores an address for each row ID, the address pointing to the LOB row in the auxiliary tables. The LOB row in the auxiliary table may include the row ID and the LOB object data. In DB2 PBG databases, each LOB column in a base table needs a separate LOB table space in each partition. For example, a PBG database with two LOB columns and three partitions has six LOB table spaces, two in each partition. The LOB rows must be kept in the same partition as the corresponding base table row.

Figure 2:
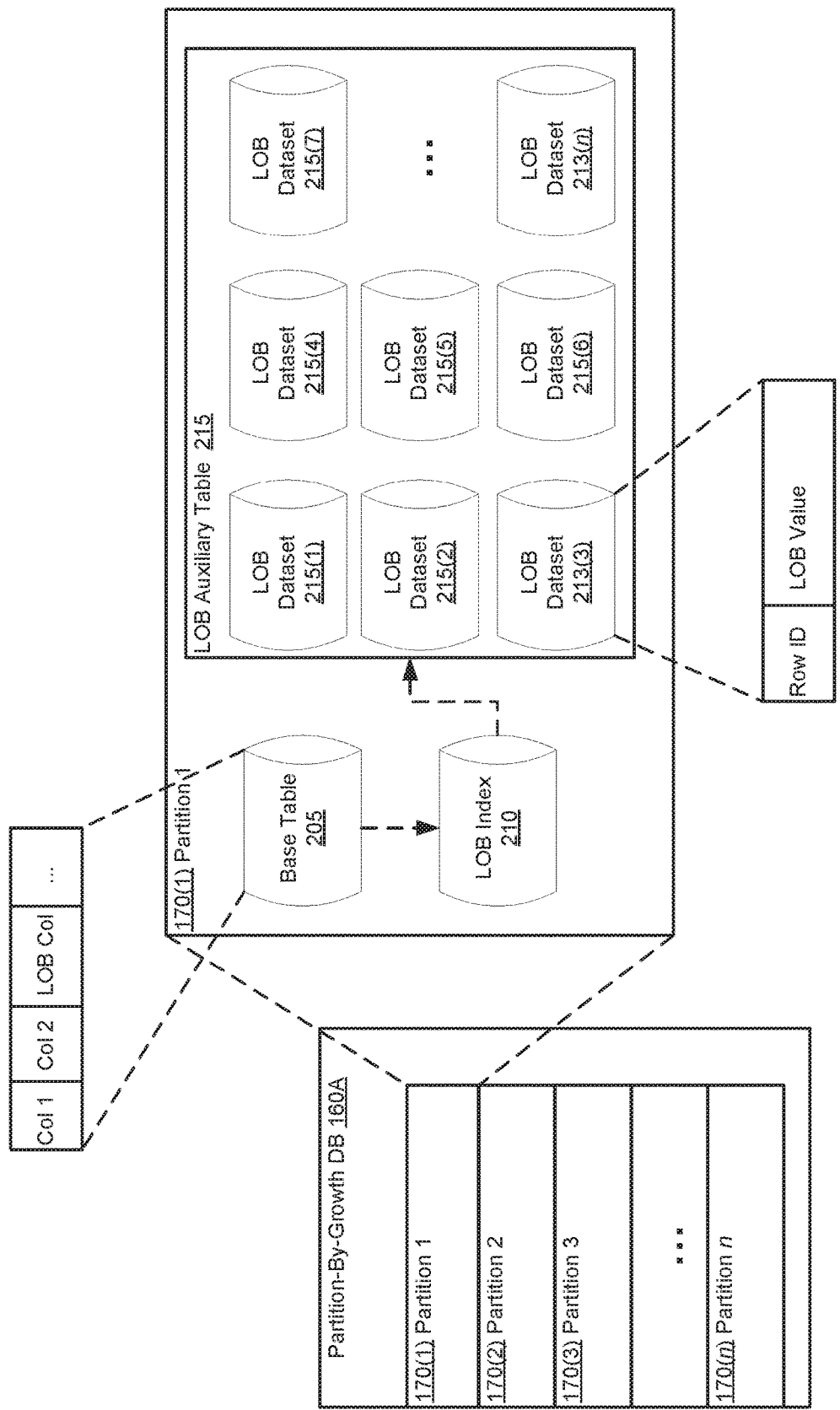
FIG. 2 is an example of a PBG database.

FIG. 2 is an example of PBG database 160A. FIG. 2 illustrates that Partition 170(1) includes base table 205, LOB index 210 and LOB auxiliary table 215. The LOB auxiliary table 215 includes a plurality of output LOB datasets. Each dataset is of a predetermined size and LOB rows cannot span datasets. Thus a plurality of output LOB datasets are associated with a particular partition. The LOB index 210 keeps track of which output dataset and the offset within the dataset that a particular LOB row resides in. The other partitions (170(2) to 170(n)) will have a similar configuration, each with a base table, a LOB index and a LOB auxiliary table having output LOB datasets.

In the example of FIG. 2, the base table 205 includes one LOB column and therefore has one LOB auxiliary tablespace in Partition 170(1). If the base table 205 included a second LOB column, the partition 170(1) would also include a second LOB index and a second LOB auxiliary tablespace. The row ID for the first LOB column and the second LOB column would be the same row ID as the row ID refers back to the base row and does not uniquely identify the LOB rows. A row in base table 205 will have a corresponding LOB row in LOB auxiliary table 215 in Partition 170(1). If the row in base table 205 were to move to a different partition, e.g., partition 170(3) as part of a reorganization operation, the LOB row in LOB auxiliary table 215 would also need to move to partition 170(3). The ability to move a LOB object between partitions as part of a reorganization process is not conventionally supported. In other words, in conventional reorganization processes for PBG datasets with LOB columns, the reorganization process may reorganize records within a partition but may not move base table rows and LOB rows to a different partition. The result is that conventional reorganization processes fail to restore the base table data to full data clustering, i.e., put the data in clustering index order.

Returning to FIG. 1, computing device 105 may include a reorganization engine 120 that performs a reorganization process on a PBG database with LOB columns that fully restores the base table to full data clustering. Thus, the reorganization engine 120 allows base table rows and LOB rows to move between partitions. The reorganization engine 120 performs the reorganization while the PBG database is available for read write access. Thus, there is no client-side outage associated with the reorganization. The reorganization engine 120 may also perform data validation checks prior to actual reorganization. While data validation check utilities may be available via the database (e.g., CHECK DATA, CHECK LOB, and CHECK INDEX available via DB2 for z/OS), such routines are not part of the reorganization task. Each of these utilities requires a read of the LOB data, which is potentially very large, and can be enormously time and resource-consuming. Some of these database provided utilities may also require disruption of the availability of the data. For example, one conventional solution is to require a full FLASHCOPY of the entire LOB object.

The reorganization engine 120 may include a LOB data check engine 122. The LOB data check engine 122 may perform the data validation functions of a database-supplied validation utility (e.g., CHECK LOB, CHECK INDEX, CHECK DATA) but may provide such validation as part of the reorganization process and perform the validations more quickly. The LOB data check engine 122 may perform all three types of validations in one operation, thus reducing the amount of processing time. The LOB data check engine 122 may generate a LOB check table 140 that enables the data validation to process the base table and the LOB auxiliary tables concurrently while still identifying possible errors such as orphaned LOB rows, missing LOB rows, inconsistent LOB rows (e.g., size of data pages does not match size value in map pages), uncorrected LOB errors, etc. For example, the LOB data check engine 122 may read the LOB index for a LOB column and build the LOB check table 140 in memory. The LOB check table 140 may include a row for each row ID in the LOB index and at least three flags. The first flag may indicate whether the base table includes a row that has the row ID in the LOB column. The second flag may indicate whether the LOB auxiliary tables have a row with the row ID. The third flag may indicate whether the data in the LOB auxiliary table is complete. For example, a LOB object can include many pages of data. These pages are managed by a series of "map" pages that list the pages that include the LOB object. The map pages include a value indicating the size of the LOB object. The individual data pages lack an identifier that links them to the specific LOB object of which they are a part but the data pages do contain the length of data on that page. The reorganization engine 120 may determine whether the sum of all the pages for a LOB object match the size value for that LOB object from the map pages. If it does not, the LOB auxiliary table is not complete and there is an uncorrected LOB error. The reorganization engine 120 can also verify that each data page belongs to one and only one LOB object. If a data page does belong to more than one LOB object, the LOB auxiliary table is not complete, i.e., is "broken" and there is a LOB error. A LOB error cannot be fixed without the user performing a Recovery of the LOB using IBM LOG data The reorganization engine 120 may also check for uniqueness, i.e., that each LOB object is referenced by one and only one base table row.

The three flags may initially be set to an unsatisfied or false state. The LOB data check engine 122 may then read the base table and the LOB auxiliary tables concurrently. When a base table record has a row ID in the LOB column, the LOB data check engine 122 may find that row ID in the LOB check table 140 and set the first flag to a satisfied or true state. If the first flag is already set to a satisfied state, the data check engine 122 may set the first flag to an unsatisfied state. The data check engine 122 may also write an error condition to an error log indicating that a single LOB object is referenced by more than one base table row. The LOB data check engine 122 may read all records in the base table, setting appropriate first flags in the LOB check table 140. Concurrently, the LOB data check engine 122 may read rows from the LOB auxiliary tables. When a row ID in the LOB auxiliary table is found, the LOB data check engine 122 may find that row ID in the LOB check table 140 and set the second flag to a satisfied or true state. If an entry in the LOB check table 140 is not found for the row ID, the LOB row is an orphan. In some implementations, the LOB data check engine 122 may automatically delete the orphan row. In some implementations, the LOB data check engine 122 may provide an error condition on an error log that lists the orphan LOB row. The LOB data check engine 122 may provide the error log to a user (e.g., via client 190 or a printed report). In some implementations, dependent on parameters provided to the reorganization engine 120, the LOB data check engine 122 may report the orphan row and delete the row.

When the LOB data check engine 122 finds a corresponding row in the LOB check table 140 for the row ID, the LOB data check engine 122 may determine whether the LOB row is complete. In other words, the LOB data check engine 122 may determine whether the sum of the lengths of the data pages for the LOB row matches a size of the LOB row in the map pages and determine whether each data page belongs to one LOB row (e.g., using the map pages). If both conditions are true, the data check engine 122 may set the third flag to a satisfied or true state, indicating the data is complete.

After the LOB check table 140 is generated and populated, the reorganization engine 120 may determine whether to continue with the reorganization operation. For example, some errors identified in the LOB check table 140 may prevent a successful reorganization, such as an unresolved LOB error. As another example, some errors, such as an orphan LOB or certain errors in the LOB index can be corrected. Whether the reorganization engine 120 continues with the reorganization, if this is an option, may depend on parameters provided to the reorganization engine 120. For instance, one parameter may indicate the reorganization engine 120 should stop, report/log the errors, but not fix the errors, another parameter may indicate the reorganization engine 120 should provide the error on an error log or report but not fix the error. Another parameter may indicate the reorganization engine 120 should report and fix errors and proceed with the reorganization, while another parameter may indicate the reorganization engine 120 should fix the errors (i.e., the ones that are fixable) and proceed without reporting the errors.

If the reorganization process proceeds after data validation, the reorganization engine 120 may perform a logical reorganization of the base table and the LOB auxiliary tables. Accordingly, the reorganization engine 120 may include a logical reorganization engine 124. The Logical reorganization engine 124 may determine how many partitions to include in the reorganized database and which base table rows belong in which partition without actually performing the reorganization. Generally, the reorganization engine 120 determines the logical order of the records in the base table by accessing the rows in the clustering index order. The logical reorganization engine 124 uses a buffer to receive the physical page number of the index leaf pages in logical order. The logical reorganization engine then transposes the buffer into a physical order, with the logical order still associated with the physical order. The logical reorganization engine 124 then creates a table, i.e., the partition assignment table 142, that includes columns for the old row number of a base table row, a new row number for the base table row, and a partition assignment. This process is described in more detail in U.S. Pat. Nos. 5,408,654 and 5,517,641, which are both incorporated by reference herein in their entirety. As part of the logical reorganization, the logical reorganization engine 124 may ensure that each partition has enough empty space to add additional data so that the clustering index order may potentially be preserved for some period of time.

The partition assignment table 142 maps each row in the base table to a new partition, which can differ from the partition that the row currently resides in. Based on the partition a base table row is assigned to, the reorganization engine 120 can determine which partition a LOB row is assigned to because the LOB row must have the same partition assignment as its corresponding base table row. In some implementations, the reorganization engine 120 may determine the LOB row assignment implicitly (e.g., by determining which partition the base table row is in from the partition assignment table 142). In some implementations, the partition assignment table 142 may include the row ID, which is different than the row number of the base table, so that the partition assignment of a LOB row can be determined directly from the partition assignment table 142. In some implementations, the partition assignment table 142 also stores the size of a LOB object (e.g., the size of the movie file).

Once the logical reorganization engine 124 has generated the partition assignment table 142, the reorganization engine 120 may reorganize the base table and the LOB auxiliary tables in parallel. The reorganization engine 120 may include a base table reorganization engine 126 and a LOB reorganization engine 128. The base table reorganization engine 126 operates concurrently with the LOB reorganization engine 128 to reorganize respective tables based on the partition assignment table 142. For example the base table reorganization engine 126 may prepare a large buffer in memory to hold the base table rows and may read the base table rows in physical order, placing them in the buffer in the correct logical position, e.g., based on the new row number of the partition assignment table 142. This process is also described in more detail in U.S. Pat. Nos. 5,408,654 and 5,517,641.

The LOB reorganization engine 128 reorganizes the LOB auxiliary tables based on the partition assignment table. In some implementations, the LOB reorganization engine 128 may determine the output LOB dataset a LOB row will be written to before writing the LOB rows. When the LOB reorganization engine 128 determines the output dataset assignments ahead of time the LOB rows can be read and written concurrently. This significantly reduces the amount of time needed to perform the reorganization. The LOB reorganization engine 128 may, for each partition (based on the partition assignment from the partition assignment table 142), sort the LOB rows assigned to the partition by size so that the largest LOB objects appear at the beginning of the sorted list. The LOB reorganization engine 128 may assign LOB rows to an output dataset using the sorted list, so that the largest LOB rows, or in other words the largest LOB objects, are placed into a dataset first. The LOB reorganization engine 128 may record the LOB dataset assignment for the LOB row in the LOB DS assignment table 144. In this manner the LOB reorganization engine can ensure, for example, that the reorganization process does not fail after writing 1.5 gigabytes of data from a 2 gigabyte LOB object because the output LOB dataset is out of space. In addition, the LOB reorganization engine 128 may write to two or more different output LOB datasets in parallel, depending on processing power of computing device 105. Thus, it is possible to be writing to every output LOB dataset concurrently because the LOB reorganization engine 128 knows ahead of time which LOB rows to write to the different output LOB datasets. Moreover, the LOB rows can be written at the same time as the base rows because the partition number is determined prior to reading and writing the rows in logical order. The reorganization engine 120 may reorganize the LOB index in the same manner as the index of the base tables.

The reorganization engine 120 may also include an update application engine 130. The update application engine 130 may apply updates that have been quiesced, or held, during the reorganization process. In other words, while the base table and LOB auxiliary tables are being reorganized the system 100 may allow the database 160 to remain available for read write access, but may save any updates and apply them to the reorganized tables. The update application engine 130 may use the partition assignment table 142 to determine where a particular row, whether a base row or a LOB row, has moved. This is needed because the update specifies the old row number/location and the partition assignment table 142 can be used to find the new location, e.g., the new partition and row number, for the update.

In some implementations, system 100 may include one or more clients 190. Clients 190 may include a display or monitor, a keyboard, a touchscreen, a camera, a mouse, a touchpad, a trackpad, a video processor, etc., through which a user may send data to and receive data from computing device 105. For example, client 190 may be a desktop computer, a laptop computer, a tablet computer, etc., running a reorganization user interface (UI) 192 that communicates with or provides parameters for the reorganization engine 120. Thus, a user may receive error logs or reports from the reorganization engine 120 or provide parameters to the reorganization engine 120 via the user interface 192. The client 190 may also use other interfaces, which are not included in the scope of this disclosure, to interact with computing device 105. It is understood that client 190 may communicate with the at least one computing device 105 via a variety of networks (not shown), whether local (e.g., LAN) or distributed (e.g., the Internet).

In some implementations, computing device 105 may include one or more other hardware components not shown in FIG. 1. For example, the computing device 105 may include a channel unit for processing Input/Output (I/O) requests, a connection to another mainframe (which may be a network interface or some other communication link such as a communication bus), a tape storage unit, a telecommunications link and other disk storage devices, e.g., sometimes referred to as a Direct Access Storage Device (DASD). Although discussed above as using an IBM zSeries® mainframe, implementations of the system 100 are not so limited as the concepts disclosed herein can be applied to other computing environments. The configuration described in FIG. 1 is one example only and implementations may include other configurations. For example, the functions performed by one or more of the LOB data check engine 122, the logical reorganization engine 124, the base table reorganization engine 126, the LOB reorganization engine 128, and the update application engine 130 may be performed by multiple modules or engines, or may be combined into a single module or engine. Furthermore, the functions may be performed in a distributed manner.

Figure 3:
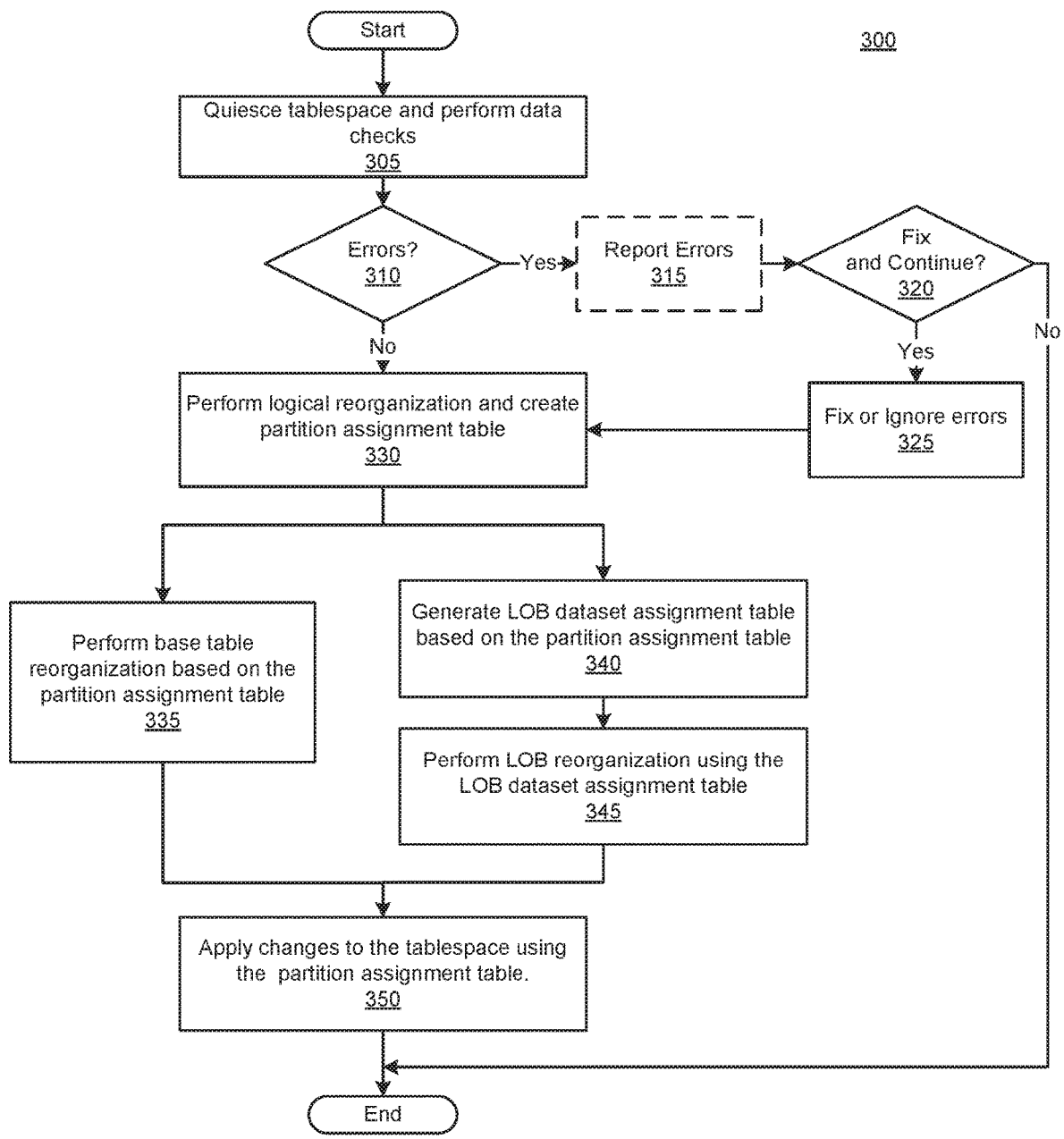
FIG. 3 is a flowchart illustrating an example process for reorganizing a PBG database with LOB columns, according to an implementation.

FIG. 3 is a flowchart illustrating an example process 300 for reorganizing a PBG database with LOB columns, according to an implementation. Process 300 is a single process that includes functionality conventionally performed by multiple processes in a serial order. The reorganized PBG database tables that result from process 300 are in clustering index order across all partitions. In other words, rows may be moved from one partition to another partition to achieve full clustering index order, something conventional PGB reorganization processes do not accomplish. Process 300 may be performed by a PBG reorganization system, such as system 100 of FIG. 1.

Process 300 may begin by quiescing the base table to be reorganized and performing data verification checks (305). Quiescing the base table and the LOB auxiliary tables enables the tables to be available for read-write updates during the reorganization process. The system collects any updates to the data and applies the updates to the reorganized tables. The system also performs data verification checks. The data verification checks find potential error conditions that may adversely affect the reorganization process. Similar checks are performed by the CHECK DATA, CHECK LOB, and CHECK INDEX utilities provided by DB2, but these DB2 utilities must run serially and can take an excessive amount of time to perform, especially on very large tables. Furthermore, in earlier versions of DB2 these processes could not be performed while the underlying base table and LOB auxiliary tables are available for write access. The data verification checks are described in more detail below with regard to FIG. 4.

The system may determine whether the data verification check resulted in any errors (310). If no error conditions are found (310, No), the system may proceed with the reorganization process. If error conditions are found (310, Yes), the system may report the error conditions (315). The reporting is optional and may be based on parameters provided to process 300. For example, the database administrator may invoke process 300 with a parameter that indicates all error conditions should be reported, a parameter that indicates only fixed error conditions should be reported, only unfixable error conditions should be reported, or that no error conditions should be reported. The system may then determine whether to continue and to fix error conditions that can be fixed (320). Whether the reorganization process continues may also be parameter based. For example, the database administrator may provide a parameter that indicates any errors should be ignored and the reorganization process should continue, a parameter that indicates fixable error conditions should be fixed and any other errors ignored, or a parameter that indicates fixable error conditions should be fixed but that other error conditions should cause the process to stop. If the parameter indicates that the process should not continue due to any of the error conditions (320, No), process 300 ends. Otherwise (320, Yes), the system fixes fixable errors (325). Fixable errors include deleting orphan LOB rows and fixing the LOB index if the index has incorrect data.

The system proceeds with the reorganization process by performing logical reorganization and creating a partition assignment table (330). The logical reorganization determines which rows get assigned to which partitions without using an external sort. As indicated above, the system may read the rows in logical order, recording the logical order and the old row number. The system may determine a new row number and partition for the base table rows. The LOB rows are assigned to the partition that their corresponding base row, e.g. identified by the row ID, is assigned to. The new row number and partition assignment are stored with the old row number in the partition assignment table. In some implementations, a size of the base table row (e.g., in bytes) and/or the row ID and a size of the LOB row may also be stored in the partition assignment table.

The system may then perform reorganization of the base table (335) and the LOB auxiliary tables (340, 345) in parallel. The base table reorganization may be similar to that described in U.S. Pat. No. 5,758,357. For example, the system may read the base table records in physical order, placing them in logical order in an in-memory buffer, the logical order being based on the partition assignment table. Concurrently the system may generate a LOB dataset assignment table (340) and reorganize the LOB auxiliary tables using the data assignment table (345). The LOB dataset assignment table assigns each LOB row to an output LOB dataset, i.e., one of the datasets assigned to the new partition. The output LOB dataset assignment enables the system to perform the reorganization of the LOB auxiliary tables much faster, as the LOB rows can be written in parallel to the new partition. The system may reorganize the LOB auxiliary tables by reading a LOB row, determining which output LOB dataset the row belongs in, based on the LOB dataset assignment table, and writing that row. If sufficient processing power is available to the system, the system can write to many output LOB datasets concurrently.

When the base table rows and the LOB auxiliary table rows have been written to the new partitions, the system may apply changes to the base table and LOB auxiliary tables that have occurred during the reorganization (350). The system may use the partition assignment table to find the correct rows to update. For example, a LOB row that had been in partition 4 may now be in partition 1. The system may use the partition assignment table to find the new location of the row and apply the update. When updates are applied, process 300 ends, having reorganized the PBG database into full clustering index order. Because the data is in full index order the system can now access the data more efficiently, which improves application performance.

Figure 4:
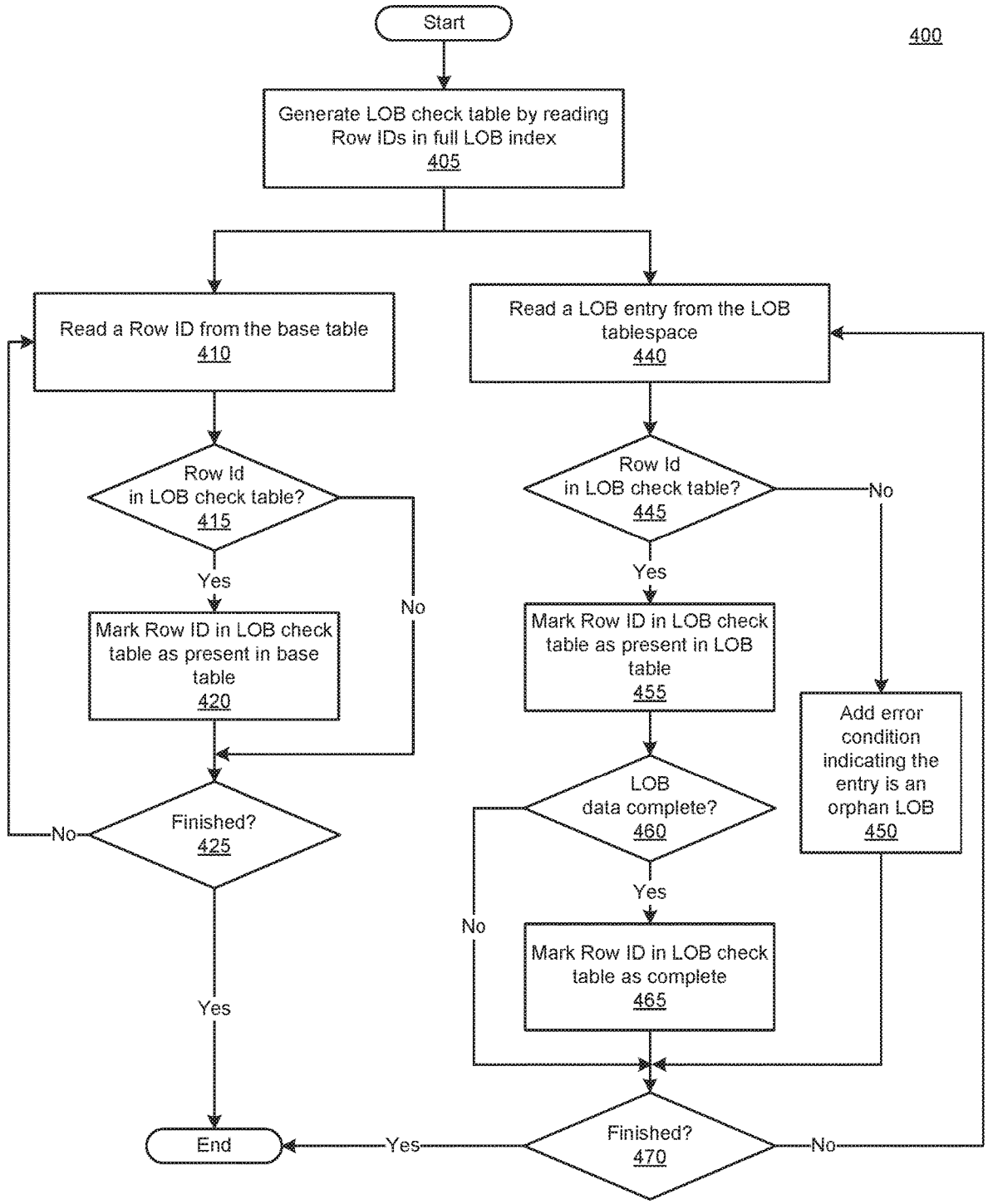
FIG. 4 is a flowchart illustrating an example process for verifying data in a PBG database as part of reorganization, according to an implementation.

FIG. 4 is a flowchart illustrating an example process 400 for verifying data in a PBG database as part of a reorganization task, according to an implementation. Process 400 performs validation checks on data in the base table and LOB auxiliary tables of a PBG database as part of a reorganization process. Process 400 may be performed by a PBG reorganization system, such as system 100 of FIG. 1 as part of step 305 of FIG. 3.

Process 400 begins by generating a LOB check table (405). The system may generate the LOB check table by reading the row IDs from the full LOB index (e.g., the LOB index tables from each partition) and writing one row in the LOB check table for each row ID. The LOB check table may also include three flags. The first flag may represent the presence or absence of a matching row in the base table. The second flag may represent the presence or absence of a matching row in the LOB auxiliary tables. The third flag may represent the completeness or incompleteness of the LOB row. As part of step 405, or in other words when the LOB check table is first generated, the status of the flags will be unsatisfied, or in other words reflecting absence of a matching row or incompleteness of data.

The system may then set the flags as appropriate by reading data from the base table and the LOB auxiliary tables in parallel. In other words, the system may perform steps 410 to 425 concurrently with steps 440 to 465. To set the first flag, the system may read a row ID from the base table (410). The system may then determine whether the row ID read from the base table exists in the LOB check table (415). If it does exist (415, Yes), the system sets the first flag, which indicates the presence of the row ID in the base table, as satisfied (420). The system then determines if there are other base table rows to read (425). If there are (425, No), the system repeats steps 410 to 425 with another base table row. Otherwise, the system has completed the validation check for the base table. If the row ID does not exist in the LOB check table (415, No), the system may maintain an entry internally that is an image of the entry built from the Index scan. If the system determines that the LOB table also includes this entry and the data is complete, the system uses the internal entry to fix the LOB index, to create an entry in the LOB Index, e.g., as part of step 325 of FIG. 3.

Concurrently, the system reads a row ID from a row in the LOB auxiliary tables (440). The system then determines whether the row ID exists in the LOB check table (445). If the row does not exist (445, No), the LOB row is an orphan row, i.e., a LOB that is not referenced by any row in the base table. Orphan rows can be deleted prior to the reorganization process to fee up additional space. The database administrator may provide a parameter that indicates the system should delete such orphan rows. The system may add an error condition, e.g., to an error log, that indicates the LOB row is an orphan row. The error condition may include sufficient information to identify the orphan row so the system can delete it prior to continuing the reorganization process. In some implementations, the system may delete orphan rows as they are identified. The error condition may also include sufficient information to communicate to a database administrator via an error report what was deleted.

If the row ID is found (445, Yes), the system may mark the second flag, e.g., indicating the presence of the row ID in the LOB auxiliary tables, as satisfied (455). The system may then determine whether the LOB data is complete (465). For example, the system may determine whether the sum of the lengths of the data pages for the LOB row matches a size of the LOB row in the map pages and determine whether each data page belongs to one LOB row (e.g., using the map pages). If both conditions are true, the data is complete. If the data is complete, the system may set the third flag in the LOB check table, e.g., representing complete LOB data, to satisfied (465). The system may continue processing LOB rows (470, No) until all rows in all partitions have been read (470, Yes). Process 400 then ends having performed data verification for the LOB auxiliary tables.

Process 400 represents a significant improvement over using database-supplied utilities such as CHECK DATA, CHECK LOB, and CHECK INDEX because process 400 verifies the data in the base table and the LOB auxiliary tables concurrently, does not require a read of the LOB data itself, and does not require disruption of the availability of the data.

Figure 5:
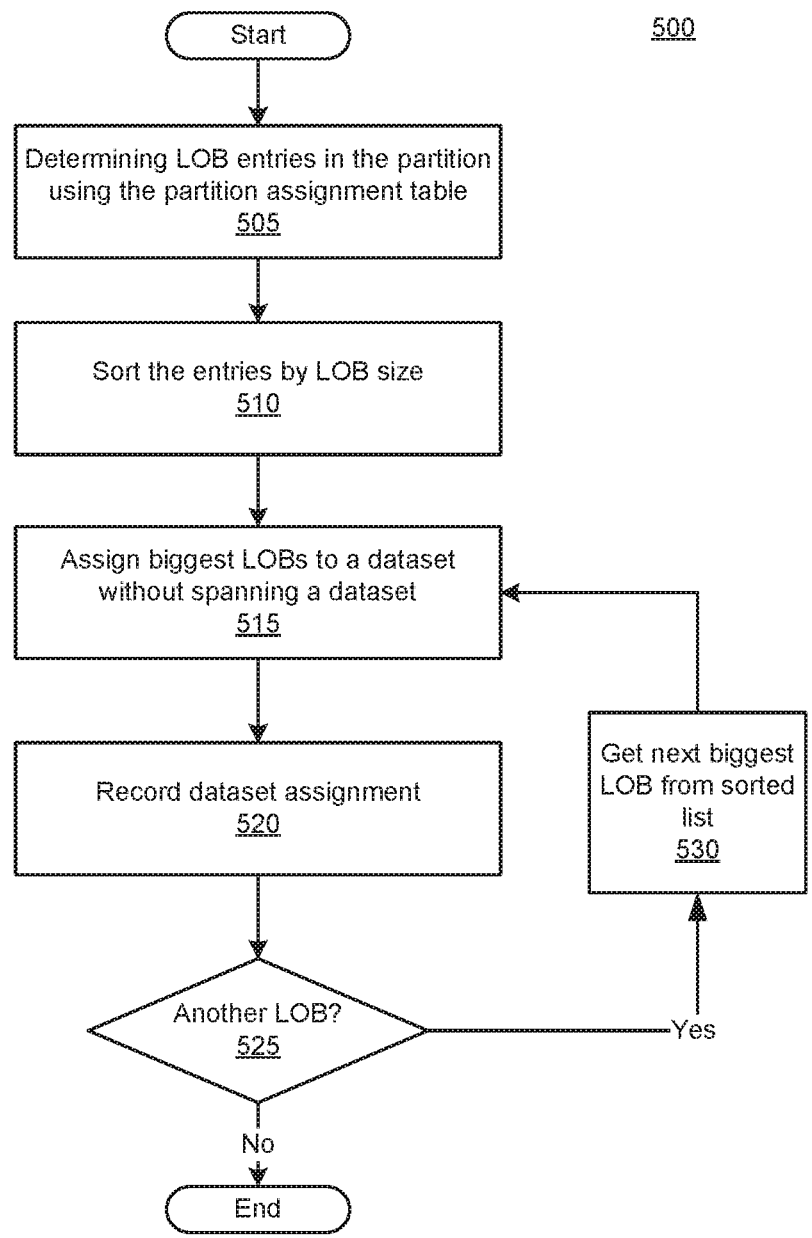
FIG. 5 is a flowchart illustrating an example process for determining output LOB dataset assignment for LOB rows, according to an implementation.

FIG. 5 is a flowchart illustrating an example process 500 for determining output LOB dataset assignment for LOB rows, according to an implementation. Process 500 assigns LOB entries to a particular LOB dataset to ensure that the entire LOB entry will fit in the dataset prior to starting the write operation and to enable the reorganization process to write LOB entries concurrently (e.g., when the LOB entries are assigned to different datasets). Process 500 may be performed by a PBG reorganization system, such as system 100 of FIG. 1 as part of step 340 of FIG. 3. Process 500 is illustrated for a single partition. In other words, process 500 works for all LOB entries assigned to a particular partition and it is understood that the system will execute process 500 for each partition in the PBG database. The partition assignment is determined e.g., as part of step 330 of FIG. 3.

Process 500 begins by determining the LOB entries in the partition using the partition assignment table (505). Each LOB row is a LOB entry and each LOB row is assigned to a partition based on the partition assignment of the base record that the LOB row corresponds to. The partition assignment table may expressly assign a LOB row to a partition, or the system may determine the partition assignment based on the base table row that corresponds to the LOB row. The system then sorts the LOB entries assigned to this partition by size (510). The sort may be an internal sort. The list may be sorted by decreasing order of size, so that the largest LOB entries appear first in the list. The system may then, starting with the largest LOB entry, i.e., starting with the first LOB in the sorted list, assign the LOB entry to one of the datasets assigned to the partition (515). The system may select the dataset based on whether or not the dataset has enough room remaining to fit the LOB entry, i.e., to avoid the need for a LOB entry to span datasets. The system may record the dataset assignment, e.g., in the partition assignment table or in a separate dataset assignment table (520). If recorded in a separate dataset assignment table, the system may have one table per partition or may indicate which partition the table rows are for.

The system may then determine whether or not any other LOB entries exist for assignment (525). For example, the system may determine whether a next LOB entry exists in the sorted list. If there is a LOB entry that has not been assigned to a dataset yet (525, Yes), the system may determine the next largest LOB entry, e.g., using the sorted list (530). The system may then assign the next largest LOB entry to a dataset (515), making sure that the LOB entry does not span datasets, and record the assignment (520). In this manner the system fits the largest LOB entries first and put smaller LOB entries in behind the larger ones. The system continues to assign LOB rows to an output LOB dataset until all LOB rows have been assigned (525, No). Process 500 then ends for this partition. The dataset assignments generated as part of process 500 speeds up the reorganization process because it enables LOB entries to be written concurrently. Because LOB entries are so large, this results in significant processing time savings.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

According to an aspect, a computing system includes at least one processor, a partition-by-growth database, the partition-by-growth database including a base table with a large object (LOB) column, the LOB column representing a row ID for a LOB index and the LOB index mapping a row ID to an address, the address corresponding to a LOB row in LOB auxiliary tables, and memory storing instructions that, when executed by the at least one processor, causes the computing system to reorganize the partition-by-growth database. Reorganizing the partition-by-growth database includes creating a partition assignment table by performing a logical reorganization of the partition-by-growth database, wherein an assignment of at least one base table row and its corresponding LOB in the partition assignment table differs from a current assignment of the at least one base table row, performing a base table reorganization based on the partition assignment table in parallel with a LOB auxiliary table reorganization based on the partition assignment table and a LOB dataset assignment table, and applying changes to the reorganized base tables and the reorganized LOB auxiliary tables using the partition assignment table.

These and other aspects can have one or more of the following features. For example, the partition assignment table may map each row of the base table to a new partition, the mapping being based on a clustering index and the LOB row associated with a row ID in a base table row may map to the same new partition as the base table row. As another example, each partition may have a corresponding LOB auxiliary table and each LOB auxiliary table may include a plurality of assigned LOB datasets and the partition assignment table may map a row ID to a new partition. In such an implementation, reorganizing the partition-by-growth database also includes, for each new partition in the partition assignment table, sorting LOB rows mapped to the new partition by size of the LOB rows, starting with a largest LOB row, assign the LOB row to one of the LOB datasets assigned to the new partition so that the LOB row does not span datasets, and recording the assignment in the LOB dataset assignment table. In some implementations, reorganization of the LOB auxiliary table includes writing LOB rows in parallel using the dataset assignment table.

As another example, reorganizing the partition-by-growth database may also include verifying row IDs and addresses in the LOB index prior to creating the partition assignment table. In some such implementations, verifying the row IDs and addresses in the LOB index can include generating a LOB check table by reading the row IDs in the LOB index, verifying whether each row ID in the base table exists in the LOB check table, verifying whether each row ID in the LOB auxiliary tables exists in the LOB check table and verifying whether the LOB row is complete when the row ID in the LOB auxiliary table exists in the LOB check table, wherein verifying whether each row ID in the base table exists in the LOB check table and verifying whether each row ID in the LOB auxiliary tables exists in the LOB check table occurs in parallel. In some implementations, when a row ID in the LOB auxiliary tables does not exist in the LOB check table, the LOB row corresponding to the row ID is deleted prior to creating the partition assignment table. In some implementations, when a row ID in the LOB auxiliary tables does exist in the LOB check table but the address does not match, verifying the row IDS and addresses in the LOB index includes fixing the address in the LOB index.

In one aspect, a method of reorganizing a partition-by-growth database while the database remains available for updates includes verifying large object (LOB) row IDs and addresses in a (LOB) index, wherein the partition-by-growth database includes a base table with a LOB column, the LOB index, and LOB auxiliary tables, generating a partition assignment table, the partition assignment table mapping each row of the base table to a new partition, the mapping being based on a clustering index, wherein a LOB row associated with a row ID in a base table row maps to the same new partition as the base table row, reorganizing in parallel the base table and the LOB auxiliary tables, wherein reorganizing the LOB auxiliary tables includes writing LOB rows in parallel, the reorganizing being based on the partition assignment table and wherein at least one LOB row changes partitions, and applying changes to the reorganized base tables and the reorganized LOB auxiliary tables using the partition assignment table.

These and other aspects can include one or more of the following features. For example, verifying LOB row IDs and addresses can include generating a LOB check table with one row per row ID in the LOB index, verifying base table rows, verifying LOB auxiliary table rows, and adding an error condition to an error log when the first flag is not satisfied or the second flag is not satisfied for a particular LOB check table entry, wherein verifying the base table and verifying the LOB auxiliary table occurs in parallel. Verifying base table rows includes, for each row in the base table, identifying an entry in the LOB check table that has a row ID that matches the row ID in the LOB column of the base table row and marking a first flag in the LOB check table entry as satisfied when the LOB check table entry is identified. Verifying LOB auxiliary table rows includes, for each LOB row, identifying a corresponding entry in the LOB check table and marking a second flag in the LOB check table entry as satisfied when the LOB check table entry is identified.

These and other aspects can include one or more of the following features. For example, verifying the base table rows also may include adding an error condition to the error log when the LOB check table entry is not identified, the error condition identifying the row ID and the base table row. As another example, verifying the LOB auxiliary table rows also may include marking a third flag in the LOB check table entry as satisfied when the LOB row has complete data. In some implementations, the method may also include adding an error condition to the error log when the third flag is not satisfied for the particular LOB check table entry. As another example, verifying the LOB auxiliary table rows can also include adding an error condition to the error log when the LOB check table entry is not identified, the error condition identifying the row ID and the LOB auxiliary table row. As another example, each partition may have a corresponding LOB auxiliary table and each LOB auxiliary table may include a plurality of assigned LOB datasets and the partition assignment table maps a row ID to a new partition. In some such implementations, reorganizing the partition-by-growth database also includes, for each new partition in the partition assignment table, sorting LOB rows mapped to the new partition by size of the LOB rows, starting with a largest LOB row, assign the LOB row to one of the LOB datasets assigned to the new partition so that the LOB row does not span datasets, and recording the assignment in the LOB dataset assignment table.

In one aspect, a method of verifying data in a partition-by-growth database, wherein the partition-by-growth database includes a base table with a large object (LOB) column, the LOB column value representing a row ID for a LOB index and the LOB index mapping a row ID to an address, the address corresponding to a LOB row in LOB auxiliary tables, includes generating a LOB check table with one row per row ID in the LOB index, verifying base table rows, verifying LOB auxiliary table rows, and adding an error condition to an error log when the first flag is not satisfied or the second flag is not satisfied for a particular LOB check table entry, wherein verifying the base table and verifying the LOB auxiliary table occurs in parallel. Verifying base table rows can include, for each row in the base table, identifying an entry in the LOB check table that has a row ID that matches the row ID in the LOB column of the base table row, and marking a first flag in the LOB check table entry as satisfied when the LOB check table entry is identified. Verifying LOB auxiliary table rows can include, for each LOB row, identifying a corresponding entry in the LOB check table, marking a second flag in the LOB check table entry as satisfied when the LOB check table entry is identified, and marking a third flag in the LOB check table entry as satisfied when the LOB row has complete data.

These and other aspects can include one or more of the following features. For example, a LOB row has incomplete data when the length of data pages for the LOB row fails to match a size of the LOB row stored in map pages. As another example, the method may also include reporting, based on user-supplied parameters, the error conditions and correcting at least some of the error conditions. In some implementations, correcting at least some of the error conditions includes determining that an error condition is an orphaned LOB row and deleting the LOB row. In some implementations, the method may also include, after correcting at least some of the error conditions, generating a partition assignment table, the partition assignment table mapping each row of the base table to a new partition, the mapping being based on a clustering index, wherein a LOB row associated with a row ID in a base table row maps to the same new partition as the base table row, reorganizing, in parallel, the base table and the LOB auxiliary tables, the reorganizing being based on the partition assignment table and wherein at least one LOB row changes partitions during the reorganization, and applying changes to the reorganized base tables and the reorganized LOB auxiliary tables using the partition assignment table.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of reorganizing a partition-by-growth database while the database remains available for updates, the method comprising:

generating a partition assignment table for the partition-by-growth database including a base table with a large object (LOB) column, a LOB index, and a LOB auxiliary table with LOB rows, the partition assignment table mapping each row of the base table to a new partition, the mapping being based on a clustering index, wherein a LOB row associated with a row ID of a particular row in the base table maps to the same new partition as the particular row in the base table, and wherein the partition assignment table also assigns each LOB row to one of a plurality of LOB datasets for the new partition to which the LOB row maps;

reorganizing the LOB auxiliary table, wherein reorganizing the LOB auxiliary table includes writing LOB rows assigned to different datasets in the partition assignment table concurrently, the reorganizing being based on the partition assignment table and wherein at least one LOB row changes partitions; and applying changes to the reorganized LOB auxiliary table using the partition assignment table.

2. The method of claim 1, further comprising performing data validation in parallel with generation of the partition assignment table.

3. The method of claim 1, wherein reorganizing the partition-by-growth database also includes, for each new partition in the partition assignment table:

sorting LOB rows mapped to the new partition in the partition assignment table by size of the LOB rows;

starting with a largest LOB row, assigning the LOB row to one of a plurality of LOB datasets assigned to the new partition so that the LOB row does not span datasets; and recording the assignment in the partition assignment table.

4. The method of claim 1, further comprising:

reorganizing the base table; and applying changes to the reorganized base table using the partition assignment table, wherein reorganizing the base table occurs in parallel with reorganizing the LOB auxiliary table.

5. The method of claim 1, further comprising verifying row IDs and addresses in the LOB index prior to creating the partition assignment table.

6. The method of claim 5, wherein verifying the row IDs and the addresses in the LOB index includes:

generating a LOB check table by reading the row IDs in the LOB index;

verifying whether each row ID in the base table exists in the LOB check table; and verifying whether each row ID in the LOB auxiliary table exists in the LOB check table, wherein verifying whether each row ID in the base table exists in the LOB check table and verifying whether each row ID in the LOB auxiliary table exists in the LOB check table occurs in parallel.

7. The method of claim 6, wherein responsive to determining that the LOB check table lacks a row ID that exists in the LOB auxiliary table, the verifying of the row IDs and the addresses in the LOB index also includes deleting the LOB row in the LOB auxiliary table corresponding to the row ID prior to creating the partition assignment table.

8. The method of claim 6, wherein responsive to determining that a row ID in the LOB auxiliary table exists in the LOB check table, but the address does not match, the verifying of the row IDs and addresses in the LOB index includes fixing the address in the LOB index.

9. A computing system comprising:

at least one processor;

a partition-by-growth database, the partition-by-growth database including a base table with a large object (LOB) column, the LOB column representing a row ID for a LOB index and the LOB index mapping a row ID to an address, the address corresponding to a LOB row in a LOB auxiliary table; and memory storing instructions that, when executed by the at least one processor, cause the computing system to perform operations including:

generating a partition assignment table, the partition assignment table mapping each row of the base table to a partition, the mapping being based on a clustering index, wherein a LOB row associated with a row ID in a base table row maps to the same partition in the partition assignment table as the base table row; and reorganizing the LOB auxiliary table, wherein reorganizing the LOB auxiliary table includes writing LOB rows in parallel, the reorganizing being based on the partition assignment table and wherein at least one LOB row changes partitions.

10. The computing system of claim 9, wherein writing the LOB rows in parallel includes:

for each partition, assigning each LOB row mapped to the partition to a dataset of a plurality of datasets assigned to the partition so that the LOB row does not span datasets, wherein rows assigned to different datasets are written in parallel.

11. The computing system of claim 10, wherein assigning each LOB row to a dataset includes, for each partition in the database:

sorting LOB rows mapped to the partition by size of the LOB rows;

starting with a largest LOB row and working to a smallest, assigning the LOB row to a dataset of the plurality of datasets assigned to the partition; and recording the assignment.

12. The computing system of claim 9, wherein the instructions cause the computing system to perform further operations including:

reorganizing the base table; and applying changes to the reorganized base table using the partition assignment table, wherein reorganizing the base table occurs in parallel with reorganizing the LOB auxiliary table.

13. The computing system of claim 9, wherein the instructions cause the computing system to perform further operations including verifying LOB row IDs and addresses in the LOB index prior to creating the partition assignment table.

14. The computing system of claim 9, wherein the instructions cause the computing system to perform further operations including:

sorting LOB rows mapped to the partition by size of the LOB rows;

starting with a largest LOB row, assigning the LOB row to one dataset of a plurality of datasets assigned to the partition so that the LOB row does not span datasets; and recording the assignment in an assignment table.

15. A method comprising:

generating a partition assignment table for a partition-by-growth database including a base table with a large object (LOB) column, a LOB index, and a LOB auxiliary table with LOB rows, the partition assignment table mapping each row of the base table to a partition, wherein a LOB row associated with a row ID of a particular row in the base table maps to the same partition as the particular row in the base table;

for each partition: assigning each LOB row mapped to the partition to a dataset of a plurality of datasets assigned to the partition so that the LOB row does not span datasets; and reorganizing the LOB auxiliary table, wherein reorganizing the LOB auxiliary table includes writing LOB rows assigned to different datasets concurrently, the reorganizing being based on the partition assignment table and wherein at least one LOB row changes partitions.

16. The method of claim 15, further comprising:
generating a LOB check table with one row per row ID in the LOB index;
for each row in the base table, verifying the row by:
identifying an entry in the LOB check table that has a row ID that matches the row ID in the LOB column of a row in the base table, and
marking a first flag in the entry in the LOB check table as satisfied responsive to identifying the entry in the LOB check table; and
adding an error condition to an error log for a row in the base table responsive to the row having a first flag this is not marked as satisfied.

17. The method of claim 16, further comprising:
for each LOB row in the LOB auxiliary table, verifying the row by:
identifying a corresponding entry in the LOB check table, and
marking a second flag in the entry in the LOB check table as satisfied responsive to identifying the corresponding entry in the LOB check table,
wherein the error condition is added responsive to the row having the first flag that is not marked as satisfied or having a second flag not marked as satisfied.

18. The method of claim 17, wherein verifying the rows in the base table and verifying the rows in the LOB auxiliary table occurs in parallel.

19. The method of claim 15, further comprising:
reorganizing the base table; and
applying changes to the reorganized base table using the partition assignment table,
wherein reorganizing the base table occurs in parallel with reorganizing the LOB auxiliary table.

20. The method of claim 15, wherein assigning each LOB row to a dataset includes:
sorting the LOB rows mapped to the partition in the partition assignment table by size of the LOB rows; and
starting the assignment of the LOB rows with a largest LOB row and working to a smallest LOB row.

* * * * *